United States Patent [19]

Eggiman et al.

[11] Patent Number: 4,878,042
[45] Date of Patent: Oct. 31, 1989

[54] APPARATUS FOR FLASHING VEHICLE LIGHTS TO WARN OF ENGINE STALL

[75] Inventors: J. Michael Eggiman, 20705 S. Sprague Rd., Redland, Oreg. 97045; Vance A. Dunlop, Troutdale, Oreg.

[73] Assignee: J. Michael Eggiman, Portland, Oreg.

[21] Appl. No.: 206,351

[22] Filed: Jun. 14, 1988

[51] Int. Cl.$^4$ .............................................. B60Q 1/00
[52] U.S. Cl. ..................................... 340/439; 340/463; 340/466; 340/467; 340/669
[58] Field of Search .................. 340/52 R, 53, 56, 66, 340/71, 72, 669, 661, 672, 438, 439, 441, 463, 467, 471; 307/10.8

[56] References Cited

U.S. PATENT DOCUMENTS

| | | |
|---|---|---|
| 1,951,495 | 3/1934 | Trafton . |
| 3,281,786 | 10/1966 | Leichsenring ........................ 340/66 |
| 3,478,312 | 11/1969 | Lee ........................................ 340/67 |
| 3,699,514 | 10/1972 | Stevens ................................. 340/60 |
| 3,790,932 | 2/1974 | Ridpath ................................. 340/71 |
| 3,846,749 | 11/1974 | Curry .................................... 340/72 |
| 3,882,452 | 5/1975 | Stevens ................................. 340/60 |
| 4,097,842 | 6/1978 | Zalar et al. ........................... 340/71 |
| 4,772,868 | 9/1988 | Chen ..................................... 340/72 |

*Primary Examiner*—Donnie L. Crosland
*Attorney, Agent, or Firm*—Klarquist, Sparkman, Campbell, Leigh & Whinston

[57] ABSTRACT

An apparatus that detects an absence of ignition pulses for warning of an engine stall. The apparatus is connected between the power source of the vehicle and the vehicle lights. If an absence of ignition pulses is detected, the apparatus generates a flashing signal that causes a switch to alternately connect and disconnect the power source to the vehicle lights to flash the lights.

16 Claims, 2 Drawing Sheets

APPARATUS FOR FLASHING VEHICLE LIGHTS TO WARN OF ENGINE STALL

BACKGROUND OF THE INVENTION

This invention relates to safety apparatus for motor vehicles and, more particularly, to an apparatus for flashing a vehicle's lights to warn others of an engine stall of the vehicle.

Hazard lights have been standard equipment on motor vehicles for some time. The driver can operate these lights by pressing a switch that is usually located on the steering column. Typically, the lights are employed by a driver who has parked adjacent to a road and wishes to warn approaching drivers of the vehicle's presence. The lights may also be employed in the case of an engine stall, wherein the vehicle loses power and its rapid deceleration in a traffic lane may cause following vehicles to collide with it. However, most drivers in such an emergency are preoccupied with steering the car to safety and will not think to turn on the hazard lights.

Apparatus are known in the art for automatically turning on the hazard lights and for flashing the headlights, taillights, and parking lights as well in the case of an engine stall. U.S. Pat. No. 3,699,415, for example, discloses an apparatus having a switch activated by engine oil pressure. If the ignition is on and the pressure drops because of an engine stall, the apparatus detects the stall and flashes the warning lights while extinguishing the headlights and taillights of the vehicle. The apparatus, however, does not work well when the engine is cold. Furthermore, the loss of headlights and taillights can be a safety hazard if the vehicle is operating on a roadway at night.

U.S Pat. No. 3,882,452 discloses an improvement over the previous apparatus by monitoring the vacuum lines of the vehicle in addition to the oil pressure. The improved apparatus also causes the headlights and taillights as well as the flasher lights to flash in the event of an engine stall. Although clearly an improvement over the prior apparatus, the improved apparatus still suffers from a number of drawbacks. The vacuum and oil pressure in the engine may vary while the engine is still running, causing unintentional flashing of the lights. The constant flashing of the headlights and taillights will also quickly drain the battery of the vehicle so that it cannot be restarted without assistance.

SUMMARY OF THE INVENTION

An object of the invention, therefore, is to provide an improved apparatus for flashing a motor vehicle's lights to warn of an engine stall.

Another object of the invention is to provide such an apparatus that detects an absence of ignition pulses to determine if the engine has stalled.

Yet another object of the invention is to limit the flashing interval to assure that the battery of the vehicle maintains sufficient charge to enable the vehicle to be restarted without assistance.

Still another object of the invention is to provide such an apparatus that flashes the brake lights of the vehicle to assure that other drivers following behind are warned of the stall.

In accordance with these objects, apparatus according to the invention comprises means for detecting an absence of ignition pulses from the ignition circuit while the ignition circuit is switched on. Signal generating means responsive to these detecting means generates a flashing signal upon signalling by the detecting means of a lack of ignition pulses. Switch means, coupled between a power source and the vehicle's lights, responds to the flashing signal to alternately connect and disconnect the power source to the lights to flash the lights. To prevent the lights from flashing during starting of the vehicle, the signal generating means is constructed to generate the flashing signal after the detecting means has signaled a lack of ignition pulses for a predetermined time.

The invention has a number of desirable features. The apparatus includes means for disabling the flashing signal after a predetermined interval of flashing to save battery power. Other means are included for disabling a flashing signal immediately if the driver switches off the ignition while the lights are flashing.

The described embodiment is a discrete construction of the invention. The invention may also be fabricated in monolithic form on an integrated circuit as is known in the art.

The foregoing and other objects, features, and advantages of the invention will become more apparent from the following detailed description of a preferred embodiment which proceeds with reference to the accompanying drawings.

DETAILED DESCRIPTION

Figure 1:
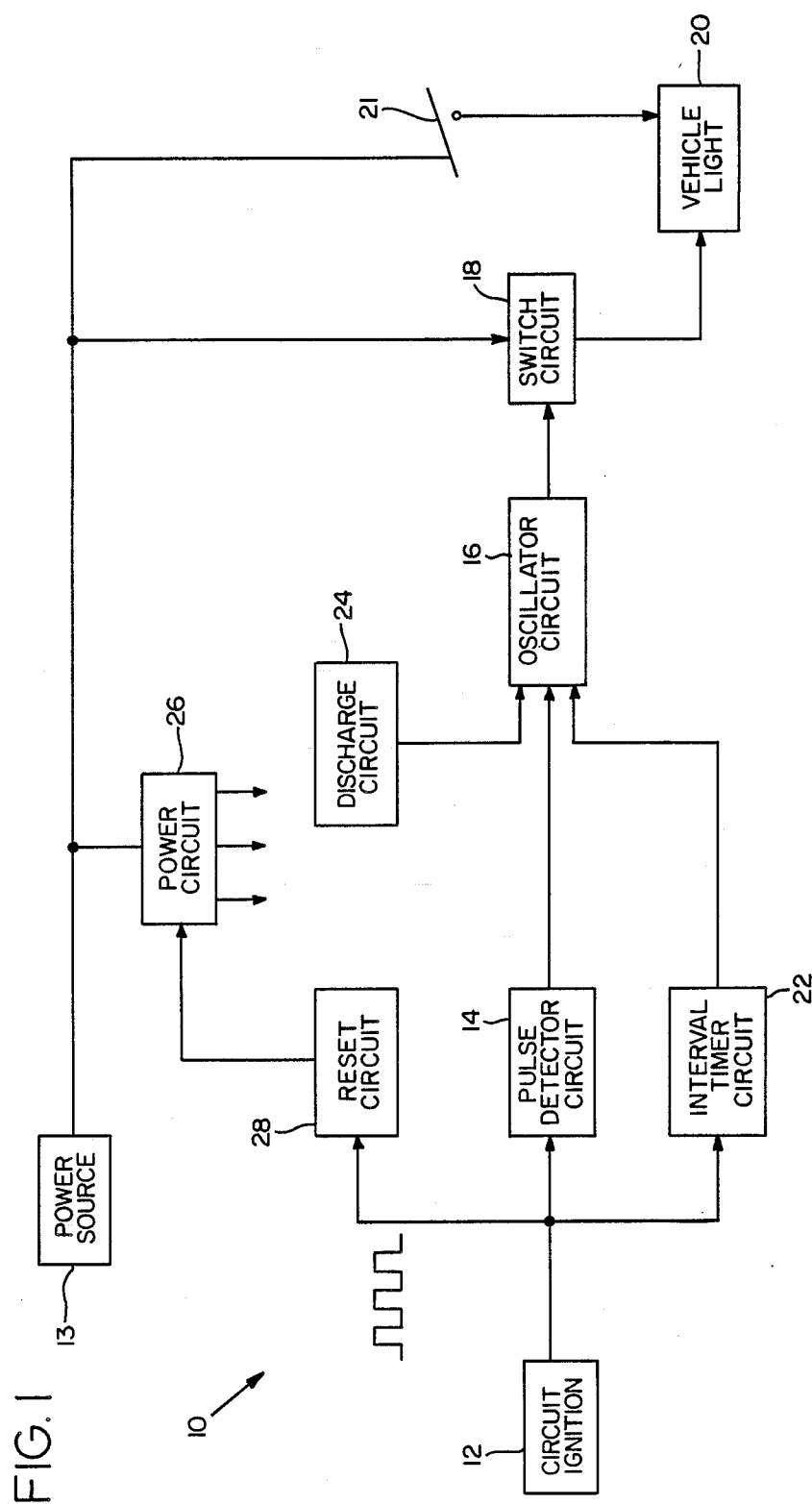
FIG. 1 is a block diagram of an apparatus according to the invention.

Referring now to the drawings, FIG. 1 is a block diagram of a warning apparatus 10 according to the invention. The apparatus 10 couples to an ignition circuit 12 that includes an engine coil employed within a motor vehicle. The circuit 12 generates ignition pulses, indicated in the figure, while the ignition is on and the engine is running. If the ignition is on and the engine is stalled, the output of the ignition circuit 12 is a steady state DC current. With the ignition off, the ignition circuit generates no current signal. Power is provided to the apparatus 10 from a power source 13 such as a terminal of a light fuse that provides current from the vehicle battery to lights within the vehicle.

Means are provided within the apparatus 10 for detecting an absence of the ignition pulses while the ignition circuit 12 is switched on. Such means may include a pulse detector circuit 14 coupled to the output of the ignition circuit 12. The detector circuit 14 is constructed so that it does not signal an absence of ignition pulses unless the time between the pulses exceeds a predetermined time. This time is calculated to be slightly greater than the maximum pulse period at a minimum idle RPM in a four cylinder engine. When the time between the pulses exceeds this predetermined time, the output of the detector circuit signals the lack of ignition pulses.

The output of the detector circuit 14 is applied to the input of signal generating means such as oscillator circuit 16. The oscillator circuit 16 responds to signalling of the detector circuit 14 after a predetermined time. That is, the detector circuit signal indicating a lack of ignition pulses must persist for a predetermined time before the oscillating circuit will respond. This predetermined time is chosen to be long enough that the starting of the engine, where no pulses are initially generated, will not be mistaken as an engine stall.

The response of the oscillator circuit 16 to the signal from the detector circuit 14 is a flashing signal that is applied to switch means such as the switch circuit 18. The circuit 18, in turn, is coupled between the power source 13 for a vehicle light and vehicle lights 20. The switch circuit 18 is responsive to the flashing signal for alternately connecting and disconnecting the power source 13 to the vehicle lights 20 to flash the lights. The vehicle lights so affected may be one or a plurality of lights on a vehicle but preferably are the brake lights because of their visibility to following drivers. By flashing the third, higher brake light of the stalled vehicle, the apparatus 10 more readily alerts the drivers of following vehicles to the engine stall. As shown in FIG. 1, if the vehicle light is a brake light, the switch circuit 18 is connected in parallel with a brake pedal 21. The brake lights thus flash until the driver steps on the pedal 21.

To conserve the power of the car battery, the duration of the flashing signal is limited in time. Means for limiting the signal comprises an interval timer circuit 22 coupled between the ignition circuit 12 and the oscillator circuit 16. The interval timer circuit 22 disables the flashing signal after a predetermined interval of flashing. This interval is measured from the time the absence of the ignition pulses is first detected.

In some cases, the driver of the vehicle may switch the vehicle's ignition off after the stall but while the lights are still flashing. To account for this possibility, means such as a discharge circuit 24 is coupled to the oscillator circuit 16 and is responsive to the switching off of the ignition to immediately disable the flashing signal.

Supply voltage for the apparatus is provided by a power circuit 26 which draws its power from the power source 13. For many vehicle lights, such as the brake lights and head lights, current from power source 13 is maintained to the vehicle lights even with the ignition switched off. To disconnect this power from the apparatus 10, power circuit 26 is disabled by way of a reset circuit 28 that determines if the engine is on by monitoring the output of the ignition circuit 12. When the ignition circuit is switched off, the reset circuit 28 disables the power circuit 26 of the apparatus 10. The discharge circuit 24 responds to this loss of power by immediately disabling the flashing signal.

Figure 2:
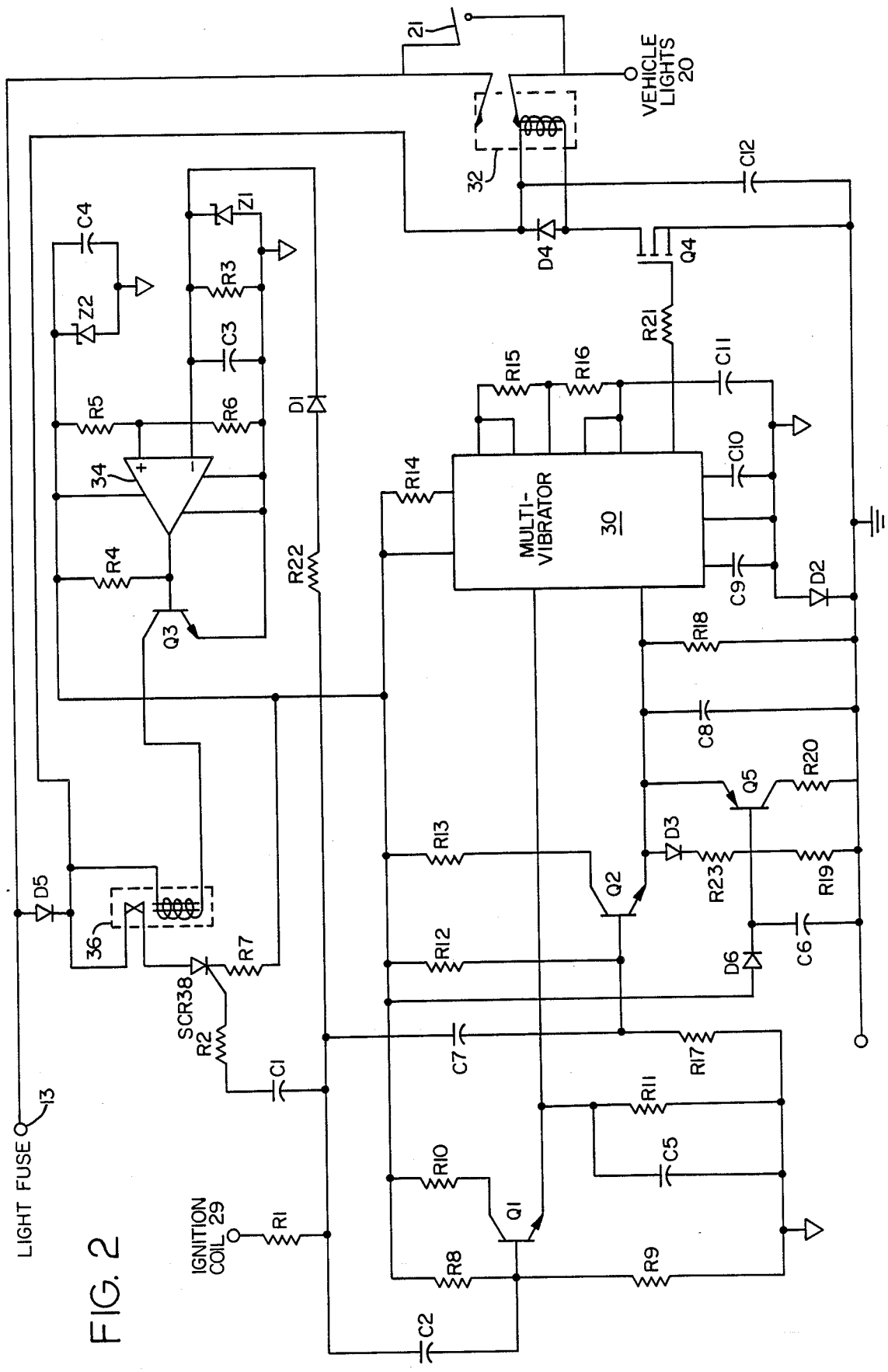
FIG. 2 is a schematic diagram of one embodiment of the apparatus shown in FIG. 1.

FIG. 2 is a schematic diagram of one embodiment of the apparatus shown in FIG. 1. The apparatus 10 is coupled via a current limiting resistor R1 to the positive connection of the primary winding of an ignition coil 29 within the circuit 12. The ignition pulses from the coil 29 are AC coupled via capacitor C2 to the detector circuit 14, which comprises a transistor Q1 biased by resistors R8 and R9, a current limiting resistor R10, and the RC network of capacitor C5 and resistor R11. The current of the ignition pulses is applied to the base of Q1 and amplified, and the charge received via resistor R10 is stored in capacitor C5 connected to the transistor's emitter. The emitter of Q1 in turn is connected to the trigger comparator input of an astable multivibrator 30 such as a 556 dual timer. The transistor Q1 thus generates a trigger signal at its emitter, with the signal level varying in response to the absence of the ignition pulses. So long as the pulses are present, sufficient charge is stored in capacitor C5 that the level is maintained between pulses above a reference voltage level present at the other input of the trigger comparator within the multivibrator 30. If the pulses are absent for greater than a predetermined time, the voltage of the trigger signal decreases over time as the stored charge bleeds through the resistor R11. A continued decrease in the signal level causes it to cross and fall below the reference voltage level to cause the voltage comparator to change its output state. The time constant of C5 and R11 is chosen so that the minimum recommended idle RPM in a four cylinder engine will hold the trigger signal voltage at capacitor C5 above the reference voltage.

The output of the trigger comparator is coupled to the oscillator circuit within the multivibrator 30 through a serial connection of resistors R15, R16 and capacitor C11. The values of this RC network are chosen to require that the absence of the pulses persist for a predetermined time before the flashing signal is generated by the multivibrator. As described above, this delay prevents the circuit 30 from generating the flashing signal when the ignition is switched on and the ignition pulses are initially absent for a brief period.

The flashing signal of the oscillator circuit within the multivibrator 30 is generated at a frequency of 2 hertz. The oscillator circuit is coupled to a switch circuit 18 that comprises a transistor Q4 and output relay 32. The contacts of relay 32 are coupled between the power source 13 and vehicle lights 20 to connect and disconnect the power source 13 from the vehicle lights 20. The flashing signal voltage is applied at the signal frequency to the gate of the transistor Q4 to cause the coil of relay 32 to alternately conduct and not conduct. The relay contacts thereby are closed and opened twice a second to flash the lights 20. When the flashing signal is absent, the contacts of relay 32 are normally open so that the pedal 21 controls the operation of the vehicle light 20. Diode D4 conducts the inductive spike from the relay 32 to protect transistor Q4. Capacitor C12 in parallel with transistor Q4 is a filter capacitor.

The interval timer circuit 22 comprises a transistor Q2, biasing resistors R12 and R17, current limiting resistor R13, and an RC network of capacitor C8 and resistor R18. The current of the ignition pulses is AC coupled via a capacitor C7 to the base of Q2 and amplified, and the charge received via resistor R13 is stored in capacitor C8 connected to the transistor's emitter. The emitter of Q2 in turn is connected to the reset input of the multivibrator 30. The transistor Q2 thus generates an internal signal at its emitter, with the signal level varying in response to the absence of ignition pulses. The values of capacitor C8 and resistor R18 are chosen to maintain the interval signal above the reset level for multivibrator 30 so long as the pulses are present. After the ignition pulses stop, the voltage on capacitor C8 decreases as charge bleeds through resistor R18, but at a slower rate than the decrease in the level of the trigger signal. The flashing signal is thus generated for a predetermined time, lasting until the level of the interval signal voltage drops below the level of the reset voltage.

The discharge circuit 24, it may be recalled, cancels the flashing signal if the driver turns the ignition off before the interval timer circuit 22 disables the signal. The discharge circuit 24 comprises in FIG. 2 a PNP transistor Q5 whose emitter is coupled to the emitter of Q2 and whose base is coupled via diode D6 to the voltage supply line for the circuit elements of the apparatus 10. So long as the supply voltage is present, the voltage at the base of transistor Q5 prevents the emitter from being forward biased to draw charge from capacitor C8. Once the ignition is switched off, however, Q5 is biased by resistors R23 and R19 to rapidly pull the voltage at the reset input low.

The power circuit 26 comprises Zener diode Z2 in parallel with a capacitor C4. Current from power source 13 is received via a relay 36 and a silicon controlled rectifier 38 (SCR), whose operation will be described, and a current limiting resistor R7. Zener diode Z2 clamps the supply voltage at a desired level. The supply voltage is applied to the transistors and multivibrators 30 via resistors R8, R10, R12, R13, R14, and diode D6.

The reset circuit 28 for electrically disconnecting the apparatus 10 from the power source 13 comprises a voltage comparator 34 that compares a voltage from the ignition coil 29 against the power supply voltage of power circuit 26. The ignition current from the coil 29 is converted to a maximum ignition voltage via diode D1, resistor R22, and Zener diode Z1. The ignition voltage is applied to the inverting input of the comparator 34. A capacitor C3 in parallel with the resistor R3 holds charge to maintain this voltage between ignition pulses. The power supply voltage at the terminal of Zener diode Z2 is applied through the voltage divider network of resistors R5 and R6 to the noninverting input of the comparator 34. The output of the comparator is coupled to the base of a transistor switch Q3 that controls the relay 36, which has normally closed contacts. Serially connected between the contacts and the other elements of apparatus 10 is the SCR 38. The gate of the SCR 38 is coupled to the primary winding of the ignition coil 29 so that the SCR conducts only after a pulse is generated. Thus, the power is disconnected until the ignition is switched on. Once switched on through SCR 1, the relay contacts are maintained in their closed position to provide an electrical connection until the ignition is switched off.

With the ignition switched on, the ignition voltage at the inverting input exceeds the power supply voltage at the noninverting input and the relay 36 remains closed. If the ignition is switched off, the voltage comparator switches states at its output. Transistor Q3 is switched to a conducting state via pull-up resistor R4 and causes relay 36 to open its contacts to electrically disconnect the apparatus 10 from the power source 13, here indicated as the terminal of a light fuse. With the power disconnected, transistor Q5 conducts temporarily to draw the reset input of the multivibrator 30 low to disable the flashing signal. The power supply voltage disappears and the contacts of relay 36 close. However, SCR 38 by then has reset and blocks current to the apparatus 10 until ignition pulses are again received at the gate.

Having illustrated and described the principles of the invention in a preferred embodiment, it should be apparent to those skilled in the art that the invention can be modified in arrangement and detail without departing from such principles. For example, the described, discrete embodiment may also be fabricated in monolithic form on an integrated circuit as is known in the art. We claim all modifications coming within the spirit and scope of the following claims.

We claim:

1. Apparatus for flashing a vehicle light to warn of an engine stall of a vehicle, the vehicle employing an ignition circuit for generating ignition pulses while the engine is running and a power source for powering the vehicle light, comprising:
   detecting means for detecting an absence of the ignition pulses while the ignition circuit is switched on;
   signal generating means responsive to the detecting means for generating a flashing signal upon signalling by the detecting means of a lack of ignition pulses; and
   switch means coupled between the power source and the vehicle light and responsive to the flashing signal for alternately connecting and disconnecting the power source to the light to flash the light.

2. The apparatus of claim 1 in which the signal generating means is constructed to respond to the signalling by the detecting means after said signalling persists for a predetermined time.

3. The apparatus of claim 1 including interval means for disabling the flashing signal after a predetermined interval of flashing.

4. The apparatus of claim 3 including discharge means for disabling the flashing signal immediately if the ignition circuit is switched off.

5. The apparatus of claim 1 including reset means for disconnecting power from the apparatus after the ignition circuit is switched off.

6. The apparatus of claim 1 in which the detecting means comprises:
   means for generating a trigger signal whose level varies in response to the absence of the ignition pulses;
   means for generating a reference voltage; and
   a trigger comparator for comparing the trigger signal against the reference voltage, the comparator output coupled to the signal generating means to cause the means to generate the flashing signal if the trigger signal level crosses the reference voltage level for a predetermined time.

7. The apparatus of claim 1 in which the signal generating means comprises an astable multivibrator.

8. The apparatus of claim 1 in which the switch means comprises:
   a transistor switch responsive to the flashing signal; and
   a relay coupled between the power source and the vehicle light and responsive to the transistor switch for connecting and disconnecting the power source to the vehicle light.

9. The apparatus of claim 1 in which the vehicle light is a brake light.

10. The apparatus of claim 1 in which the ignition circuit is an ignition coil.

11. The apparatus of claim 3 in which the interval means comprises means for generating an interval signal whose level varies in response to the absence of the ignition pulses, the level of the interval signal dropping below a predetermined level after the interval of flashing, the signal generating means responsive to the interval signal level.

12. The apparatus of claim 5 in which the reset means comprises:
   a reference voltage;
   a voltage comparator for comparing the output of the ignition circuit against the reference voltage to determine if the ignition circuit is switched off;
   a relay coupled to the output of the voltage comparator and responsive to the output for disconnecting the power source from the apparatus when the ignition circuit is switched off.

13. Apparatus for flashing a vehicle light to warn of an engine stall of a vehicle, the vehicle employing an ignition circuit for generating ignition pulses while the engine is running and a power source for powering the vehicle light, comprising:

- means for generating a trigger signal whose level varies in response to the absence of the ignition pulses;
- a reference voltage;
- an astable multivibrator for comparing the trigger signal against the reference voltage, the multivibrator being configured to generate a flashing signal if the trigger signal level crosses the reference voltage level; and
- switch means coupled between the power source and the vehicle light and responsive to the flashing signal for alternately connecting and disconnecting the power source to the light to flash the light.

14. The apparatus of claim 13 including interval means coupled to the reset input of the astable multivibrator for resetting the multivibrator to disable the flashing signal after a predetermined interval of flashing.

15. The apparatus of claim 13 including discharge means coupled to the reset input of the astable multivibrator for resetting the multivibrator immediately to disable the flashing signal if the ignition circuit is switched off.

16. Apparatus for flashing a vehicle brake light to warn of an engine stall of a vehicle, the vehicle employing an ignition coil for generating ignition pulses while the engine is running and a power source for powering the vehicle brake light, comprising:

- means for generating a trigger signal whose level varies in response to the absence of the ignition pulses;
- a reference voltage;
- an astable multivibrator for comparing the trigger signal against the reference voltage, the multivibrator being configured to generate a flashing signal if the trigger signal level crosses the reference voltage level for a predetermined time;
- a transistor switch responsive to the flashing signal;
- a relay coupled between the power source and the vehicle light and responsive to the transistor switch for alternately connecting and disconnecting the power source to the vehicle brake light;
- interval means coupled to the reset input of the astable multivibrator for resetting the multivibrator to disable the flashing signal after a predetermined interval of flashing; and
- discharge means coupled to the reset input of the astable multivibrator for resetting the multivibrator immediately to disable the flashing signal if the ignition circuit is switched off.

* * * * *